April 9, 1940.                M. T. SCHOMACKER                2,196,597
                                OPTICAL SYSTEM
                              Filed July 1, 1938

Inventor
Max T. Schomacker,
By
Attorney

Patented Apr. 9, 1940

2,196,597

UNITED STATES PATENT OFFICE 2,196,597

OPTICAL SYSTEM

Max T. Schomacker, West Los Angeles, Calif., assignor to Radio Corporation of America, a corporation of Delaware Application July 1, 1938, Serial No. 216,938

8 Claims. (Cl. 179—100.3)

This invention relates to sound recording apparatus and particularly to the optical system employed for light impressing a moving light-sensitive film in accordance with sound waves.

Various types of sound recording systems are well known in the art, such as the variable density and variable area systems, while each of these may be further classified by the type of track formed on the film. The nomenclature for certain types of sound track may be found in the June, 1938, issue of the Journal of the Society of Motion Picture Engineers, page 656.

The present invention is directed to a recording system in which certain optical elements may be quickly and accurately interchanged for the purpose of recording or rerecording different types of tracks. It is well understood that in the photographic recording of sound that lenses and apertures are employed and that these elements must be very accurately focused and aligned to avoid distortion. This is particularly true since the light beam reaching the film is of small dimensions. In the variable area type of recording system, differently shaped apertures are used to define the form of the beam projected on the slit, which, in turn, determines the type of trace made on the film when the beam is modulated by movement thereof in accordance with the amplitude and frequency of sound waves. This necessitates a particularly accurate adjustment of the beam-shaping mask, light source, lenses, slit, etc. Therefore, when an element of the optical system was removed and replaced by another to produce a different type of track, much time was consumed in making adjustments. Even where an adjustment was predetermined and a common fastening means used for the interchanged elements, it was found that this common fastening means would not maintain the elements in accurate adjustment after several substitutions had been made. The present invention solves this problem by assuring that each element will be returned to its previously determined accurate position.

An object of the invention, therefore, is to provide an optical system for a sound recording system which is adaptable to the recording of various types of sound tracks.

Another object of the invention is to facilitate the adjustment of a recording system element.

Another object of the invention is to facilitate the interchange or substitution of optical elements, such as lenses and light-forming masks, of a recording system without necessitating subsequent adjustments thereof.

Although the novel features which are believed to be characteristic of this invention will be pointed out with particularity in the claims appending herewith, the manner of its organization and the mode of its operation will be better understood by referring to the following description read in conjunction with the accompanying drawing forming a part thereof, in which Figure 1 is a plan diagrammatic view of the optical arrangement of a well known variable area recording system;

Figure 1:
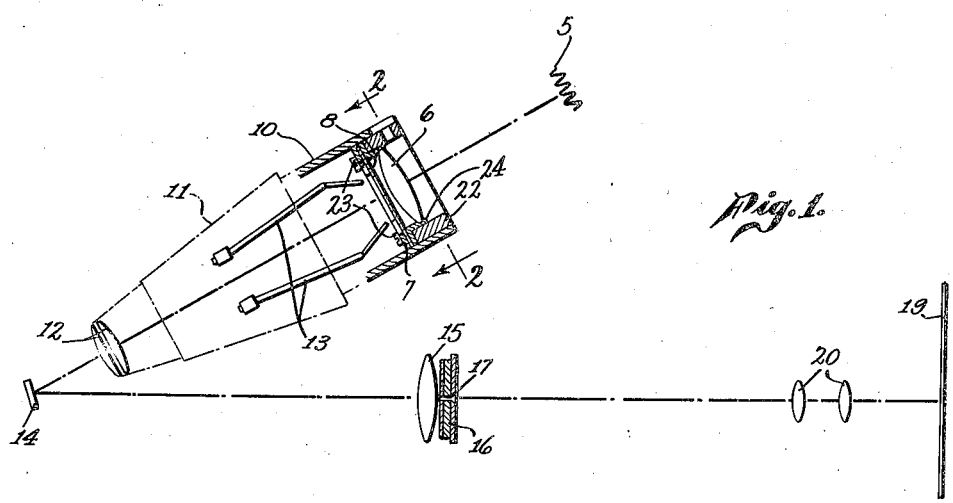

Referring now to Fig. 1, light from a source illustrated by filament 5 is collected by a lens 6 and projected through a light-forming mask 7. A filter 8 for the purpose of selecting a particular range of light wave lengths may or may not be employed. After the light beam has been formed into the shape determined by the mask 7, it passes through the housing 10, a portion of which is shown in cross-section and the remainder shown by dotted lines 11, and then through an objective lens 12 at the end of the housing. A pair of shutters 13 vary the length of the beam in accordance with the mean amplitude variation of the sound waves as is well known in the art. The light is then impressed upon a modulating mirror element 14 in a galvanometer (not shown) from which it is reflected through a lens 15 to a slit mask 16 having a slit 17 therein. After passing through the slit 17, the light is then projected upon a film 19 by objective lenses 20. This is the usual type of optical arrangement for producing variable area or width records, although the system is also capable of producing variable density records depending upon the arrangement of various optical elements.

Figure 2:
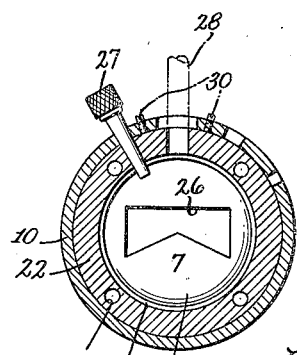
Figure 2 is a cross-sectional view of an interchangeable element of the system taken along the line 2—2 of Fig. 1.
Figure 3:
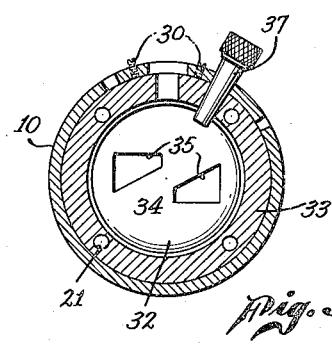
Figure 3 is the same view as shown in Fig. 2 of a second interchangeable element.
Figure 4:
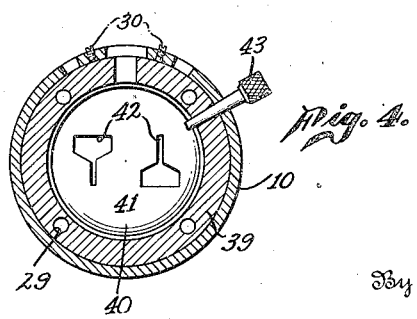
Figure 4 is the same view as shown in Figs. 2 and 3 of a third interchangeable element.

It will be noted that the mask 7 is fastened to a circular ring 22 by means of screws 23, the filter 8 lying intermediate the mask and ring. The screw holes are shown in Figs. 2, 3 and 4 at 18, 21 and 29, respectively. An L-shaped collar 24, also intermediate the mask and ring, maintains lens 6 in position within the ring, thus forming an assembly which may be removed from or inserted within the cylindrical casing 10 as a unit.

In Figs. 2, 3 and 4, various assemblies are shown in position within the casing 10, each assembly having a mounting ring, lens, mask and possibly a filter. Thus, Fig. 2 shows the particular optical assembly of Fig. 1 with its mounting ring 22, lens 6 and mask 7 with M-shaped aperture 26. This unit is shown held in position by a tapered pin 27 having a knurled head. Also shown by dotted lines 28 and positioned in an aperture in the ring 22 is a rod used for orienting the assembly within the cylindrical casing 10. Also shown in dotted lines on each side of the aperture are two set screws 30, the rod and set screws being used solely for the purpose of adjusting and holding the mask assembly while the holes are drilled and reamed for the pin 27. That is, the mask assembly is placed within the casing 10, moved along the optical axis of the lens 6 and rotated until the proper positioned image of the mask 7 is produced on the slit mask 16. When this adjustment is obtained, the two set screws 30 are tightened to hold the assembly in position. The hole or holes for the tapered pin 27 are then drilled and accurately taper-reamed to accommodate the pin which will thereafter maintain the mask and lens elements in proper position or return them thereto if the assembly is removed and then replaced. The screws may or may not be used thereafter.

Referring now to Fig. 3, the casing 10 is shown containing another assembly including a lens 32, collar 33 and a mask 34 having a pair of apertures 35 therein for making a Class-A push-pull record. That is, it only requires this variation in the optical arrangement of Fig. 1 to change the track being recorded from a duplex variable area track made by mask 7 to a Class-A push-pull record, providing that the mask and lens of the assembly of Fig. 3 are in proper adjustment when substituted for the assembly of Fig. 2. It will be noted that the assembly in Fig. 3 is held in position by a tapered pin 37 larger than pin 27 of Fig. 2 and located in a different position on the casing 10 and in ring 33 than pin 27. However, the tapered holes for pin 37 are located and made after mask 34 and lens 32 are adjusted in the manner described for the assembly of Fig. 2, although they are, of course, made larger to accommodate the larger pin. This permits the positioning of the component parts of each assembly to vary from one another since each assembly is independently adjusted in the system. Thus, not only do the pins 27 and 37 maintain the respective elements of their assemblies in accurate position, but they distinguish the different assemblies and prevent misplacement thereof.

Referring now to Fig. 4, a third interchangeable assembly for the system of Fig. 1 is shown having a mounting ring 39, a lens 40 and a mask 41 containing a pair of apertures 42 for recording a Class-B push-pull type of track. This assembly employs a third pin 43 at still a different location in the casing 10 and collar 39 than the positions occupied by pins 27 and 37, while the pin 43 is smaller than the pin 27. Thus, each lens and mask assembly employs a different sized pin at different positions on the casing 10, the drilling and positioning of the different holes and pins being accomplished in the manner described in connection with Fig. 2. It is understood, of course, that after each assembly has been adjusted by means of pin 28 and held by screws 30 until the tapered holes have been made and the tapered pin fitted therein, the pin 28 and screws 30 are not thereafter necessarily needed as the respective tapered pin for each assembly will accurately align the mask and focus the lens.

By this method and means of interchanging aperture assemblies for obtaining different film tracks, the interchange is greatly facilitated and the accuracy obtained is as perfect as the original adjustment. Thus, the recording operators who may not be as skilled as the factory engineers, are enabled to quickly and accurately change the optical system to record any particular track as mentioned above. It is to be understood that other forms of masks for other types of tracks are within the scope of the invention.

I claim as my invention:

1. An optical system comprising a fixed cylindrical casing, a lens and mask assembly adapted to be adjusted within said casing, a radial aperture in said casing, a radial aperture in said assembly, and a pin adapted to be inserted in said apertures, said pin adjusting said assembly to a preadjusted position.

2. An optical system in accordance with claim 1 in which said apertures and said pin are cooperatively tapered to permit said pin to adjust said assembly in said casing.

3. A support for interchangeable optical elements comprising a fixed cylindrical casing, a plurality of mask assemblies adapted to be interchanged within the said casing, a plurality of different sized radial apertures in said casing, an aperture in each of said assemblies to correspond to one of said casing apertures, and a plurality of different sized pins, a particular aperture of said casing and of each assembly being adapted to accommodate a particular pin.

4. In an optical system adapted to light-impress a light-sensitive material with light varied in accordance with sound waves and having an optical system for defining the form of said light, a plurality of mask assemblies adapted to be interchanged in said optical system for producing different types of light forms, all of said assemblies having a cylindrical collar with the same outside diameter, a lens and a mask, said masks having different shaped apertures therein, and said collars having tapered holes of different sizes at mutually exclusive positions, and a fixed cylindrical casing adapted to accommodate any one of said collars, said casing having a plurality of tapered holes at mutually exclusive positions therein, and a plurality of pins, a particular pin being adapted to determine the respective position of each of said collars within said casing.

5. A system in accordance with claim 4 in which said tapered holes are of different sizes and said pins of corresponding sizes.

6. In a sound recording system, an optical unit having a fixed cylindrical casing, a plurality of radical holes of different sizes in said casing, a plurality of unitary assemblies having external collars with an outside diameter comparable to the internal diameter of said casing, each of said collars having a radial hole adapted to align with one of said holes in said casing, a mask in each of said assemblies having an aperture therein differing from other of said masks, and a tapered pin corresponding in size to each of said apertures for aligning said mask when positioned within said casing.

7. An optical system comprising a casing, an assembly adapted to be adjusted within said casing, an aperture in said casing, an aperture in said assembly, and means adapted to be inserted in said apertures, said means adjusting said assembly in said casing to a pre-adjusted position.

8. A support for interchangeable optical elements comprising a casing, a plurality of assemblies adapted to be interchanged within said casing, a plurality of different-sized apertures in said casing, an aperture in each of said assemblies to correspond to one of said casing apertures, and a plurality of different-sized pins, a particular aperture of said casing and of each assembly being adapted to accommodate a particular pin.

MAX T. SCHOMACKER.